March 8, 1966 N. CORDIS 3,239,056
CHAIN AND TROUGH CONVEYOR WITH DEMOUNTABLE CHAIN LINKS
Filed March 23, 1964 2 Sheets-Sheet 1

Inventor.
Nat Cordis.
By Everett A. Johnson
Attorney.

March 8, 1966  N. CORDIS  3,239,056
CHAIN AND TROUGH CONVEYOR WITH DEMOUNTABLE CHAIN LINKS
Filed March 23, 1964  2 Sheets-Sheet 2
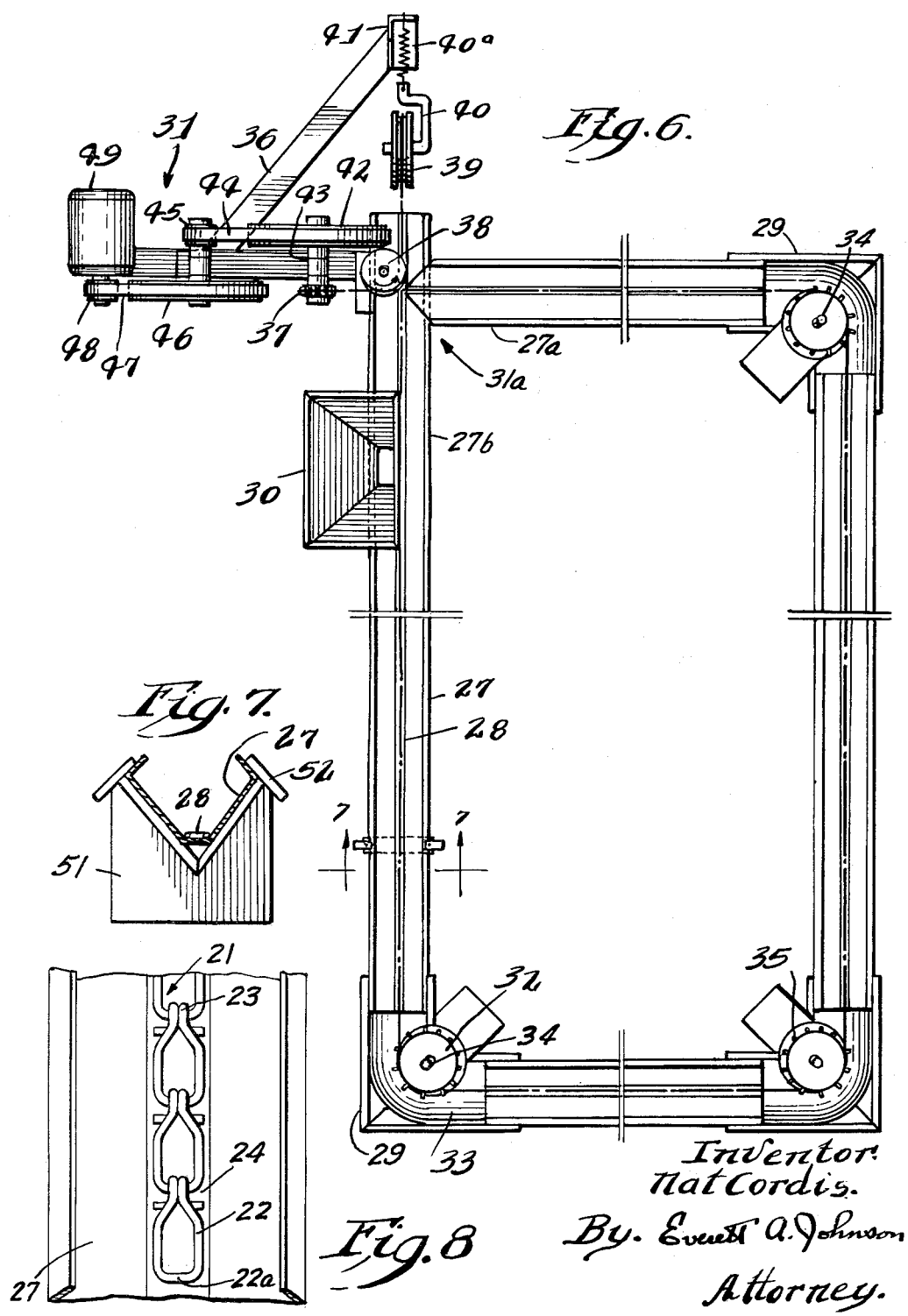

United States Patent Office 3,239,056
Patented Mar. 8, 1966

3,239,056
CHAIN AND TROUGH CONVEYOR WITH
DEMOUNTABLE CHAIN LINKS
Nat Cordis, deceased, late of Silver Lake, Wis., by Gladys
S. Cordis, executor, Chicago, Ill., assignor, by direct and
mesne assignments, of one-third to Carl F. Jensen and
one-sixth to Gerald T. Dobie, Rosemont, Ill., and one-
half to Gerald L. Kitson, Rockford, Mich.
Filed Mar. 23, 1964, Ser. No. 355,526
4 Claims. (Cl. 198—171)

This application is a continuation-in-part of application Serial No. 84,383, filed January 23, 1961, which in turn is a division of application Serial No. 750,456, filed July 23, 1958, now Patent No. 2,994,299.

This invention relates to conveyors for flowable solid materials and, more particularly, to a feeding system for distributing pulverant materials from a bulk hopper along an open-topped trough which is accessible to stock including poultry. More specifically, the invention is an improvement in a system for automatically distributing feed from a jumbo hopper in a closed circuit trough-type poultry feeder.

The feeding of livestock such as poultry on a large scale necesarily involves the handling of large quantities of feed and heretofore considerable manual attention has been required to provide an adequate bulk supply for automatic feeders. Accordingly, a primary object of this invention is to provide a method and automatic means for uniformly distributing fresh feed within a continuous or closed circuit flock feeder. An additional object is to provide a feeder chain which is of rugged and inexpensive construction. A more specific object of the invention is to provide a flexible conveyor element which is of simple sturdy construction, is readily demountable, and is uniform in its feed carrying capacity. These and other objects of the invention will become apparent to those skilled in the art as the description thereof proceeds.

Briefly, this invention provides improved poultry or stock feeders of the type wherein a feed conduit, comprising an open-topped horizontal trough, is arranged in communication with a feed supply hopper of unique design and wherein an endless flexible distributing means, comprising a demountable distributing chain, is moved longitudinally of the trough within a closed circuit.

The word "flights" as used hereinafter has reference to the straight lengths of trough and to the lengths of the demountable distributing chain which runs within the same portion of the trough. At intersecting flights, corners are provided for directing the strands at about 90° angles. At the corners it is desired to change the direction of travel of the endless flexible demountable distributing chain in the presence of a minimum feed. Accordingly, the feed supply hopper may be placed at any convenient point along the trough, but ordinarily will be placed over a flight just beyond a corner.

I have devised a positive drive means which is placed at one of the corners, and in traversing the drive corner two flights of distributing chain are superposed in a cross-over whereby the feed being distributed is caused to discharge upon the chain emerging from the drive, such emerging chain being substantially free of feed.

The distributing chain preferred for use in my improved feeder is a demountable wire-formed link chain. The chain link includes laterally extending portions which enhance the feed carrying capacity of the distributor without the use of individual paddles and the like.

A take-up can be provided for the conveyor chain by making one or more of the pulleys in the drive corner adjustable with respect to another pulley therein. Alternatively, a weighted conveyor take-up or a telescoping portion of two trough sections may be adjustably linked to provide the necessary take-up.

Details of my invention will be described by reference to particular embodiments thereof illustrated in the drawings wherein:

FIGURE 6 is a plan view of a preferred embodiment of the invention and showing details of the drive;

FIGURE 7 is a section taken along the line 7—7 in FIGURE 6; and

FIGURE 8 is an enlarged fragmentary top view of a segment of the trough and conveyor shown schematically in FIGURE 6.

Figure 1:
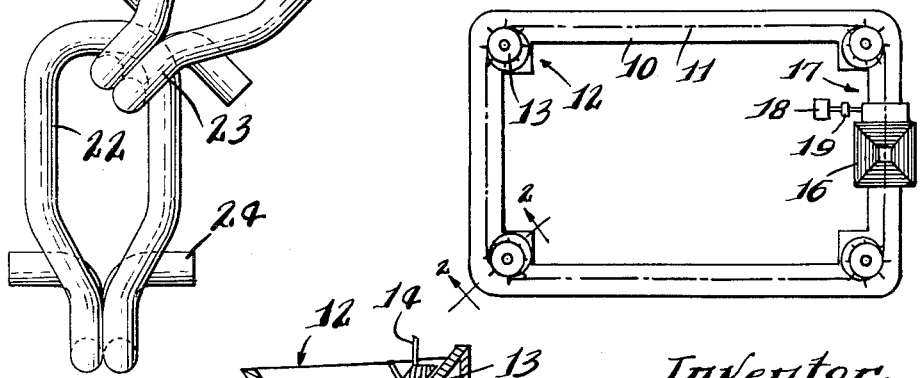
FIGURE 1 is a schematic plan view showing the general arrangement of closed circuit feeder embodying the principles of my invention.

Referring to FIGURE 1, a stock feeder is shown having an open-topped trough 10, an endless flexible distributing or conveying strand 11 running on the bottom of the trough 10, a supply hopper 16 from which feed discharges onto the strand 11, drive means 17, and idler corners 12 for guiding the strand 11 around the circuit, and for holding the strand 11 within the trough 10.

Figure 2:
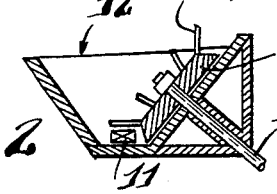
FIGURE 2 is a section through the trough taken at line 2—2 in FIGURE 1.

The idler corners 12 include idler corner pulley 13, guide pins 14 on the pulley 13, and the inclined pulley shaft 15 on which the pulley 13 is mounted, as shown in FIGURE 2. The drive unit 17 is driven by motor 18 through transmission 19.

Figure 5:
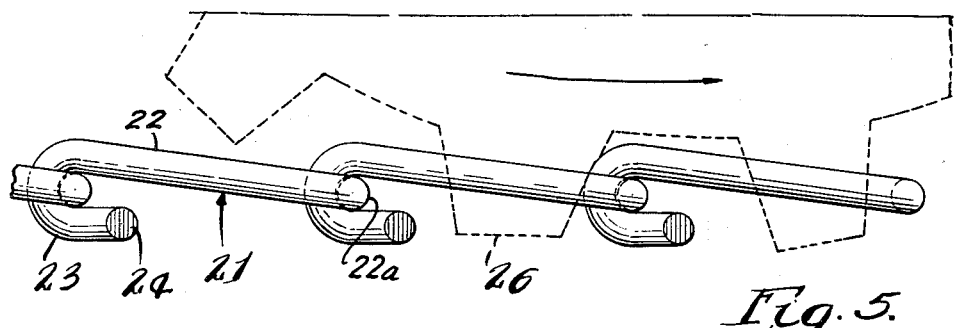
FIGURE 5 is a side elevational view of the chain in FIGURE 3 in drive position.
Figure 3:
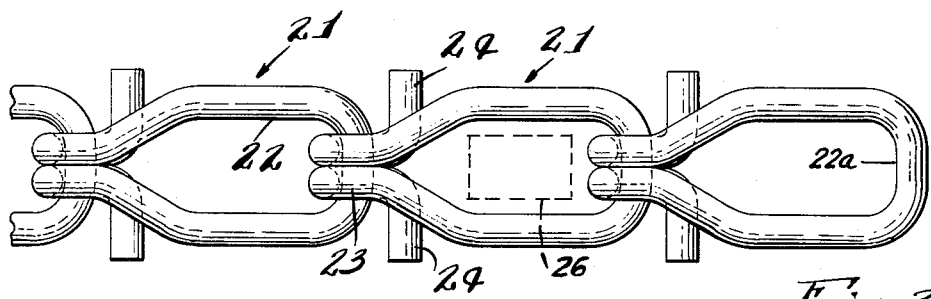
FIGURE 3 is a plan view of a chain formed according to the invention.
Figure 4:
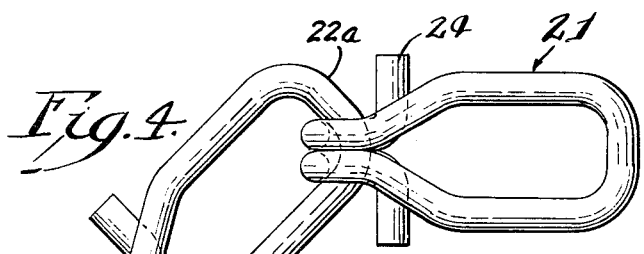
FIGURE 4 is a view similar to FIGURE 3, but illustrating how the chain can flex in the plane of the links.

Referring to FIGURES 3, 4 and 5, the improved links 21, each of which is formed of a single length of wire, each comprises a loop body 22, a shank 23 and oppositely disposed bars or wings 24. By rotating an end link 21 about a shank 23 and sliding the rotated link 21 along the loop body 22 of an adjacent link 21, the bars 24 can be disposed centrally of the loop body 22 permitting the separation of the rotated link from the remaining links.

The demountable chain formed of the links 21 may be driven through a trough by a sprocket 26, as shown in FIGURE 5. It will be understood, however, that other types of drives may be used and will be illustrated by reference to other figures herein.

With reference to FIGURES 6 and 7, this embodiment of the invention comprises a trough 27 within which a conveyor 28 travels counter-clockwise, picking up feed from the hopper 30 and then in series through the idler corners 29 and the connecting flights of trough 27 by means of the drive unit 31. Three of the flights of the trough 27 are in substantially the same plane with the fourth or cross-over flight terminating at an elevated point in the drive corner 31a. Thus, the entering flight of trough 27 and the strand and/or conveyor superpose the emerging strand 28 and any feed still carried by the entering strand 28 after making the circuit is dropped from the end of the entering trough section 27a and deposited upon the emerging flight 28 in the lower section 27b of the trough 27 to be recirculated. If desired, an intercepting screen or separator may be interposed the entering and emerging strands to separate litter from the recirculated feed.

The drive mechanism or unit 31 comprises a drive unit frame 36 on which is mounted drive sprocket 37. The drive sprocket 37 is driven by drive pulley shaft 43, drive pulley 42, drive belt 44, transmission pulley 45, and transmission drive 46. The motor 49, the motor pulley 48 and the motor drive belt 47 apply power to the transmission drive 46.

As the drive sprocket 37 is rotated, the conveyor 28 is drawn over the sprocket 37, around the drive corner pulley 38, over and under the take-up pulley 39, and into the trough 27. The take-up pulley 39 is resiliently mounted by means of take-up pulley bracket 40 and take-up spring 40a, which is secured to the anchor 41, mounted on drive unit frame 36.

Referring to the idler corners 29, each comprises an idler pulley 32, a curved baffle plate 33, and an inclined pulley shaft 34. The pulley 32 is provided with conveyor guide pins 35, and the entire assembly 29 is generally similar to that shown in FIGURE 2.

In FIGURE 7, I have illustrated one means for supporting the trough 27, this includes a support block 51 and pairs of opposed trough clamping bars 52. Such support means may be provided at spaced points along the closed circuit of trough 27, as may be necessary to provide the required support and elevation.

Briefly, the invention claimed herein comprises a demountable distributing chain link of unique design which is moved longitudinally of a trough as shown in FIGURE 8 within a closed circuit such as shown in FIGURES 1 and 6.

The distributing chain link includes a demountable wire-formed link 21 having laterally extending portions 24 which enhance the feed carrying capacity of the distributor 11 without applying individual paddles and the like to the chain. Thus the feed-engaging portions of the conveyor link are unitary and on the trailing portion 23 of the link.

The flexible endless conveyor comprises an articulated series of such links, each link having a forward pintle portion 22a and a rearward hook portion 23 which includes the feed-engaging lateral bars 24. The hook portion 23 receives the pintle portion 22a of the rearwardly adjacent link. The outwardly extending stabilizing and feed-engaging lateral portions are below and forward of the pintle portion. Thus, each link 21 rides only on the lateral portions 24 and slopes downwardly along its longitudinal axis in the direction of travel of the articulated conveyor.

In operation the leading loop portion 22 of the link 21 distributes the feed laterally and the outwardly extending feed-engaging portions 24 push and convey the plowed feed longitudinally in the didection of chain travel. The downwardly and forwardly inclined sides of the loop 22 further assist in urging the conveyor to travel on the bottom of the trough 10 (27) under the feed.

The foregoing description has been with respect to a closed circuit system wherein three idler corners are associated with a single drive corner. It is contemplated, however, that the principles of design incorporated herein may be utilized in a closed trough circuit which includes only a drive end and a turnaround end with conveyor flights running in parallel therebetween in the same trough.

Although the apparatus has been described in terms of particular embodiments thereof which have been set forth in considerable detail, it should be understood that this is by way of illustration only and that the invention is not limited thereto. Alternative constructions and operating techniques will become apparent to those skilled in the art in view of the foregoing disclosure and, accordingly, it is contemplated that modifications can be made without departing from the spirit of the described invention.

What is claimed is:

1. A poultry feeder including in combination a trough and demountable conveyor assembly in said trough, said conveyor comprising a plurality of interlocked links, each link formed of a single length of material to form an elongated loop, a shank comprising two parallel juxtaposed lengths which double back axially of said loop to provide a loop-engagaing hook, and a pair of outwardly extending terminal bars arranged symmetrically of said loop and transverse to the said shank, said loop being unobstructed by said outwardly extending bars and each link being supported by said bars thereby placing said loop in a plane sloping downwardly along the longitudinal axis thereof toward the corresponding bars of the next adjacent link whereby the downwardly sloping loop assists in urging the conveyor assembly to travel on the bottom of the trough under the feed therein.

2. A conveyor assembly including in combination a trough and a chain in said trough, said chain being formed from interlocking links that comprise wire-formed units including an elongated loop, a shank integral with one end of said loop and comprising two parallel and juxtaposed segments of the wire forming the unit, said shank doubling back on itself toward the closed end of said loop to form a hook, and a pair of symmetrical terminal arms extending transverse to said loop and being integral with said shank, each such shank being hooked over the closed loop portion of each such unit, providing a continuous linked assembly with uniformly spaced transverse feed-engaging portions consisting of said transverse terminal arms, said arms supporting each link on the bottom of said trough in a downwardly and forwardly inclined array with the next preceding link.

3. A stock feeder including in combinatioin a trough and a chain conveyor in said trough, said chain conveyor comprising an endless continuous demountable chain conveyor comprised of a plurality of wire-formed links, each link including a loop closed at one end, a double shank portion unitary with the other end of said loop, said shank doubling back axially of said loop, and a pair of outwardly extending terminal bars arranged symmetrically transverse to said loop, said shank hook receiving the closed end of said loop and said bars supporting each link above the bottom of the said trough when the conveyor passes therealong, said loop distributing feed laterally and the outwardly extending bars conveying the distributed feed longitudinally of said trough in the direction of conveyor travel therethrough.

4. A poultry feeder including in combination a trough and a chain conveyor in said trough, said conveyor comprising a flexible endless conveyor traversing a bottom portion of said poultry feeder to convey poultry feed substantially throughout the length thereof, said conveyor being comprised of a series of articulated similar links, each link having a forward pintle portion and an integral rearward hook portion with an open loop therebetween, said hook portion receiving the pintle portion of the rearwardly adjacent link, and outwardly extending stabilizing and feed-engaging lateral portions below and forward of said pintle, each link riding only on said lateral portions, and said loop portion is in a plane sloping downwardly along the longitudinal axis of the loop toward the next preceding link, the said loop portions distributing feed laterally and said outwardly extending, feed-engaging, lateral portions conveying the distributed feed longitudinally of said trough in the direction of conveyor travel therethrough.

References Cited by the Examiner
UNITED STATES PATENTS 237,489 2/1881 Coonley _____ 74—248
2,736,420 2/1956 McCarthy _____ 198—171

SAMUEL F. COLEMAN, *Primary Examiner.*